United States Patent [19]
Sowers et al.

[11] 3,845,869
[45] Nov. 5, 1974

[54] LOADING AND UNLOADING DEVICE

[75] Inventors: Blaine E. Sowers, Grabill; Vaughn E. Hunnicutt, Fort Wayne, both of Ind.

[73] Assignee: North American Van Lines, Inc., Ft. Wayne, Ind.

[22] Filed: Apr. 30, 1973

[21] Appl. No.: 355,311

Related U.S. Application Data
[63] Continuation-in-part of Ser. No. 224,094, Feb. 7, 1972, Pat. No. 3,774,788.

[52] U.S. Cl. ............................... 212/65, 214/75 H
[51] Int. Cl. ............................................ B66c 23/02
[58] Field of Search ..................... 212/65; 214/75 H

[56] References Cited
UNITED STATES PATENTS

| | | | |
|---|---|---|---|
| 2,131,133 | 9/1938 | Babson | 212/65 |
| 2,292,353 | 8/1942 | Ennis et al. | 214/75 H |
| 2,300,374 | 9/1942 | Turner | 212/65 X |
| 3,578,179 | 5/1971 | Fujioka | 212/65 X |

*Primary Examiner*—Robert B. Reeves
*Assistant Examiner*—Hadd Lane

[57] ABSTRACT

The invention is a portable loading and unloading device which comprises a boom pivotably connected to a mast or mast element adapted to be received in any one of the complementary shaped recesses of the sidewall of a cargo compartment. Latch means is provided for securing the mast or mast element in the recess against movement in a direction laterally outwardly from the sidewall. The sidewall of the cargo compartment and the sides of the recess prevent lateral movement in other directions. So mounted to the sidewall, the boom is swingable about a generally vertical axis.

17 Claims, 6 Drawing Figures

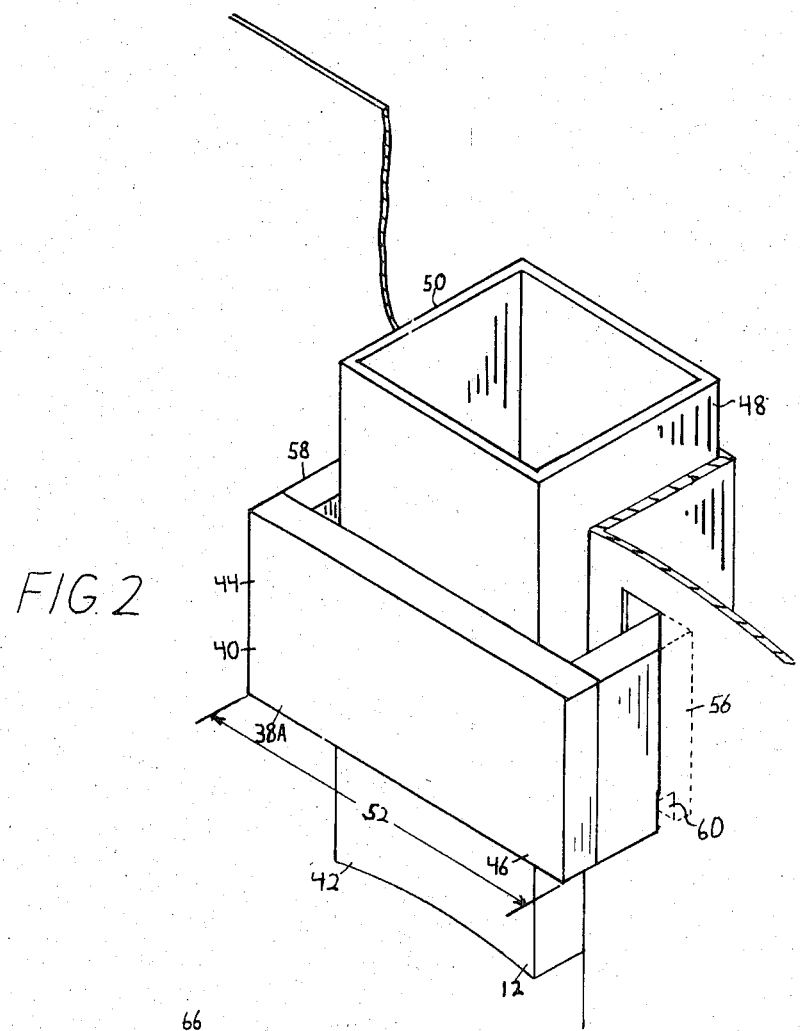
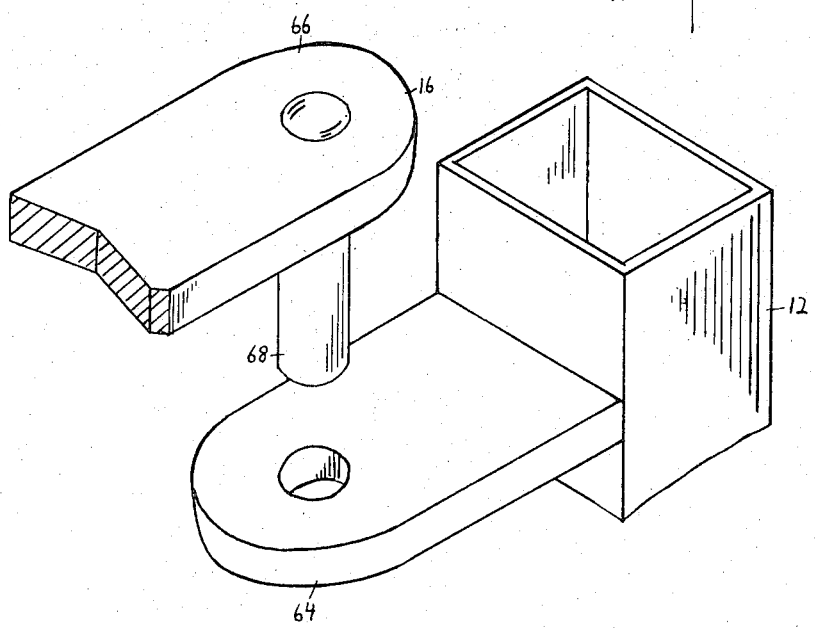

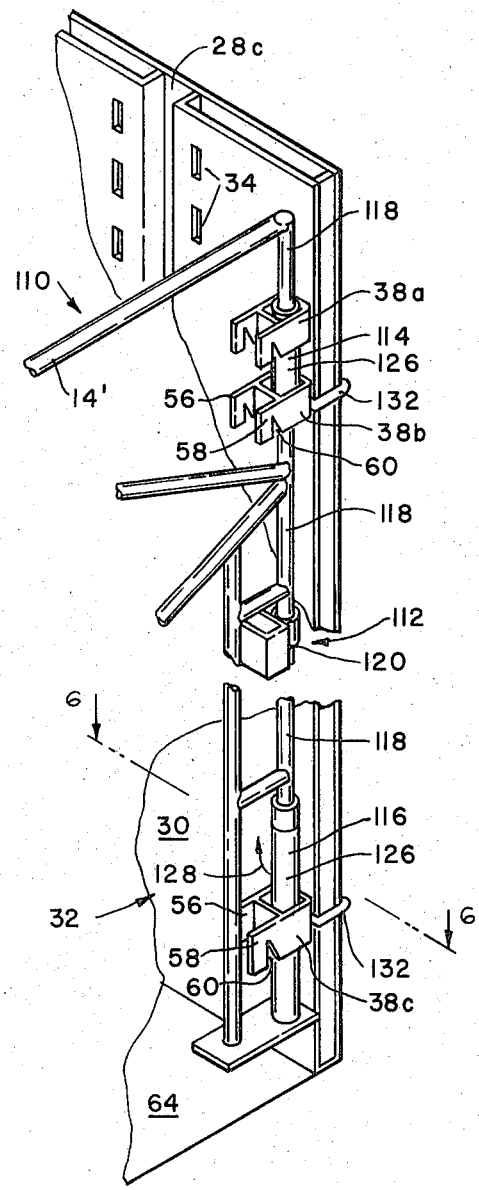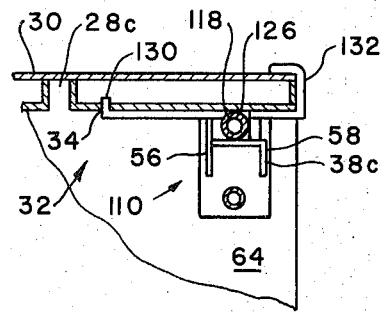
FIG-5
FIG-6

LOADING AND UNLOADING DEVICE

CROSS REFERENCE TO RELATED APPLICATION

This application is a continuation-in-part of application Ser. No. 224,094 filed on Feb. 7, 1972, now U.S. Pat. No. 3,774,788, entitled "Loading and Unloading Device."

BACKGROUND OF THE INVENTION

1. Field of the Invention

The present invention relates to devices for loading and unloading and more particularly to a portable device which is adapted to be received by and detachably secured to the sidewall of a cargo compartment of a moving van, railroad car or the like without modification thereto.

2. Description of the Prior Art

Various forms of prior art devices are used to assist in loading and unloading cargo into and out of cargo compartments. Such devices would be of special value for use with vehicles such as moving vans, which are used for transporting household goods, and railroad boxcars. Frequently these vehicles are loaded and unloaded at sites where no facility for loading and unloading, such as an elevated dock, an overhead crane, or the like is provided.

While devices have heretofore been provided for use in the cargo compartments of moving vans, they have been relatively expensive and have been permanently attached to the van. Further, such devices have occupied a portion of the cargo area such that less cargo can be carried by the van; some such devices have restricted the use of vans equipped with the devices because of the cargo space occupied by the loading and unloading device.

The cargo compartment of a moving van is provided with a sturdy floor and upstanding sidewalls having a plurality of spaced apart vertically extending recesses therein with adjacent holes in which cargo straps are conventionally attached. A loading and unloading device, capable of carrying relatively heavy loads, for example, a piano or the like, which could be attached to the wall has an advantage over some prior art devices inasmuch as the full vertical height of the cargo compartment could be utilized for cargo. Further, a portable device which could be removably attached to the wall of a cargo compartment of a moving van would be highly desirable inasmuch as one such moving device could be used in loading and unloading several different vans. Such a device could also be removed from the van so as to limit loss from theft. It would therefore be highly desirable to provide a portable loading and unloading device which could be detachably secured to the upstanding wall of a cargo compartment of a moving van or the like which would be economical to manufacture and convenient to use.

SUMMARY OF THE INVENTION

The invention, in its broader aspects, is a loading and unloading device which comprises a mast, or other member, adapted to be received in a complementary shaped recess in the sidewall of a cargo compartment. A latch for securing the mast in the recess against movement in a direction outwardly therefrom is provided. A boom is pivotably secured to the mast for swinging movement about a generally vertical axis. Because the recess within which the mast is received is a conventional part of a cargo compartment, the device can be used with a number of different cargo compartments simply by removing it from one and installing it in another.

A specific embodiment includes a manually operable winch having a cable windingly attached thereto, the distal end of the cable being provided with a conventional appliance harness or other apparatus for securing a load thereto.

It is therefore an object of the invention to provide an improved loading and unloading device for use in a cargo compartment.

It is another object of the invention to provide a portable loading and unloading device which can be removably attached to and supported by the conventional wall and floor structure of a cargo compartment.

It is still another object of the invention to provide such a device which can be used with a conventional moving van.

It is yet another object of the invention to provide such a device which is economical to produce and convenient to use.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 2 is a fragmentary perspective view of the loading and unloading device showing details of the latch of the device;

FIG. 3 is a fragmentary perspective view of the loading and unloading device showing details of the hinges;

FIG. 5 is a fragmentary and perspective view of the loading and unloading device illustrated in FIG. 4 showing the device mounted adjacent the rear opening of the cargo compartment of a moving van; and FIG. 6 is a fragmentary view of the loading and unloading device shown in FIG. 5 taken substantially along the section line 6—6.

DESCRIPTION OF THE PREFERRED EMBODIMENT

Figure 1:
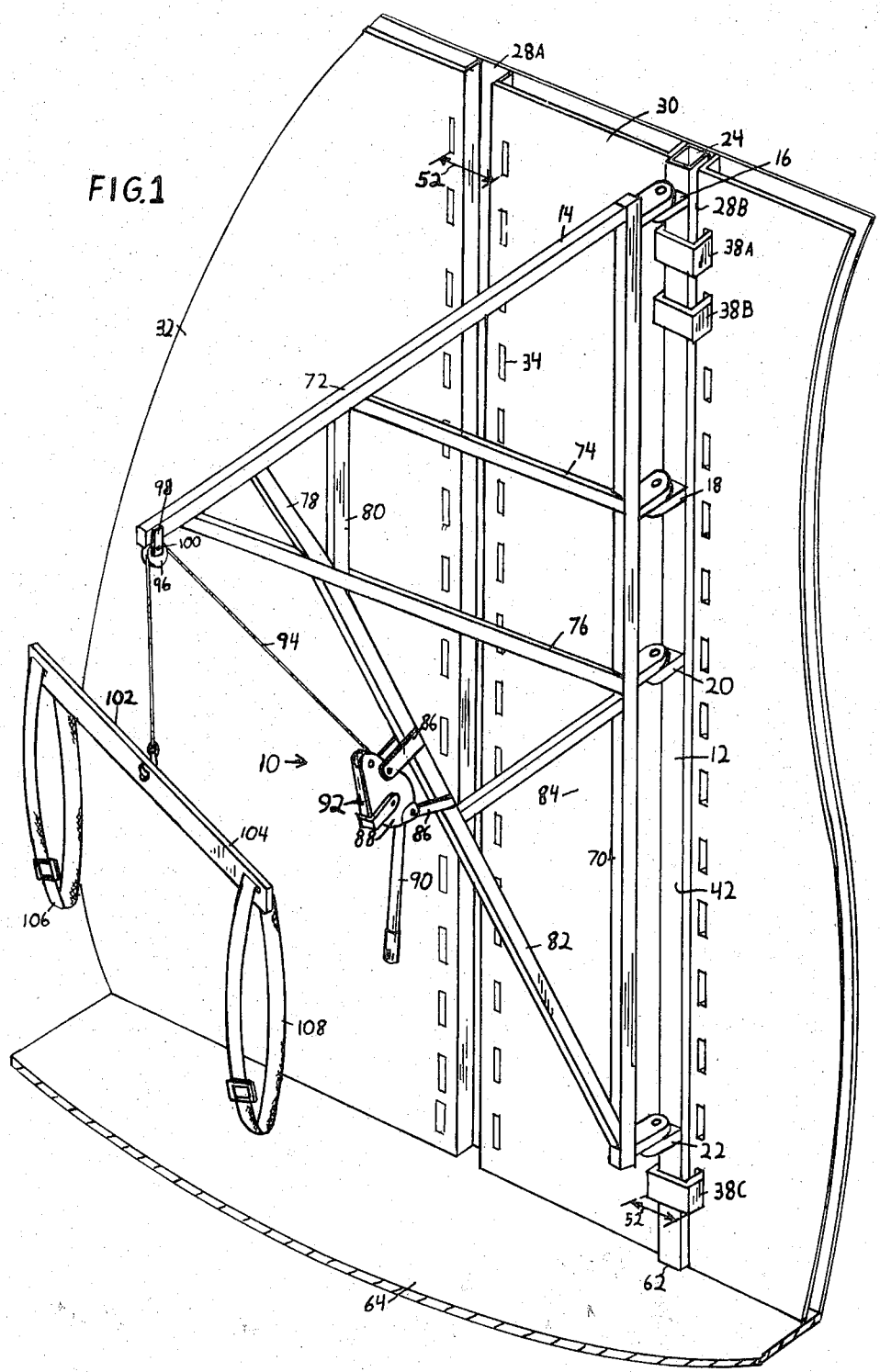
FIG. 1 is a perspective view of the loading and unloading device of the invention shown secured to a fragmentary portion of a cargo compartment.

Referring to FIGS. 1 through 3, there is illustrated a loading and unloading device 10 which includes an upstanding mast 12 and a boom assembly 14 pivotably secured to the mast 12 by a plurality of hinges 16, 18, 20 and 22. Mast 12 has a longitudinal axis 24 and a rectangular cross section whereby mast 12 is adapted to be received within a selected one of a plurality of elongated, rectangular, vertically positioned recesses 28a, 28b, 28c which are provided in the upstanding sidewall 30 of a vehicle cargo compartment such as indicated generally at 32.

Recesses 28a, 28b, 28c are a conventional part of a vehicle cargo compartment 32. There are also provided a plurality of perforations or holes as at 34 adjacent recesses 28a, 28b, 28c, perforations 34 being arranged in vertically, spaced apart columns as shown. These perforations are again a conventional part of the cargo compartment of vehicles such as moving vans and railroad boxcars, the perforations normally being used to fasten cargo straps used to secure the load within the cargo compartment.

When mast 12 is positioned within a recess 28b as illustrated, it is supported against movement in three lateral directions by the walls of the recess. To provide a means for securing the mast 12 in the recess 28b and prevent movement thereof outwardly of the recess 28b there are provided a plurality of latch means 38a, 38b and 38c.

As can best be seen in FIG. 2, each of the latch means 38a through 38c includes a laterally extending bar portion 40 which is secured to the outwardly facing surface 42 of mast 12 as by welding. The length of bar 40 is greater than the width of mast 12 whereby the distal ends 44, 46 of bar 40 extend laterally outwardly from the sides 48, 50 of mast 12. The length of bar 40 has a dimension 52 equal to the lateral distance between the outwardly disposed edges of related pairs of perforations 34.

Each of the latches 38a through 38c further includes a pair of hook elements 56, 58 which are secured to the distal ends 44, 46 of bar 40, respectively, and extend in parallel, spaced apart relationship to sides 48, 50 of mast 12. The cross section of each hook element 56, 58 is complementary to the shape of the perforations 34 whereby, when mast 12 is received within recess 28a, the distal ends of hook elements 56, 58 are slidably received into the perforations.

Formed in the lower surface of elements 56, 58 are suitable notches as at 60 which, when hook elements 56, 58 have been inserted into the perforations 34, permit the latch means 38a to be moved downwardly into a position wherein the notches 60 engage a portion of the sidewall 30 thereby securing the mast 12 within the recess 28a.

The latch means 38a through 38c are secured to the mast 12 in vertically, spaced apart relationship in positions wherein each of the latch means 38a through 38c is in registry with predetermined ones of the perforations 34. Due to the force distribution upon the mast 12, two of the latch means 38a and 38b are secured to the mast 12 adjacent its upper end while a single latch means 38c is secured to the lower end thereof.

The lower end 62 of the mast 12 is provided with a foot which abuttingly engages the floor 64 of the compartment 32 to support the entire loading and unloading device 10 and the load carried thereby. The hook elements 56, 58 are positioned with respect to the perforations 34 and the notches 60 are sized and shaped such that the notches 60 engage sidewall 30 to prevent outward movement of mast 12 from the sidewall 30 when the foot or lower end 62 engages the floor 64, but do not support to any appreciable extent the weight of the device 10 or the load carried thereby. Ideally, the entire weight of the loading and unloading device and the load carried thereby is borne by the floor 64 and the latches 38a through 38c only prevent the mast 12 from moving outwardly from the sidewall 30 and out of the recess 28a.

As best seen in FIG. 3, hinge 16 includes a fixed portion 65 and a pivotable portion 66. Fixed portion 65 is fixedly secured to mast 12 as by welding and extends horizontally outwardly therefrom. Pivotable portion 66 is similarly fixedly secured to the boom assembly 14 as by welding and is provided with a vertically extending hinge pin 68 adjacent its distal end. Fixed portion 65 is provided with a hinge pin hole 67 proportioned to slidably receive hinge pin 68. Hinges 18, 20 and 22 are constructed identically to hinge 16 and they require no further description except to note that they are fixedly secured to the mast 12 in vertically, spaced apart relationship.

Boom assembly 14 includes an upstanding post 70 and a horizontally extending arm 72 having one end thereof fixedly secured to the upper end of post 70 as by welding. A plurality of braces 74, 76, 78, and 80 are welded between arm 72 and post 70 to reinforce the structure and a strut 82 is welded between braces 76 and the lower end of post 70. Thus welded together, the post 70, arm 72, and braces 74 and 76 and strut 82 form a truss capable of supporting a substantial weight while itself being light in weight. Further, the shape of the truss is generally triangular with post 70 and arm 72 being orthogonally disposed with respect to each other whereby, when the truss assembly 84 is extending outwardly from wall 30 of compartment 32, it does not interfere or prevent entry and egress from the compartment. The shape of the truss further provides for clearance of articles being supported by the loading and unloading device.

Adjacent the central portion of strut 82 are welded a plurality of brackets 86 which provide a means for securing a conventional winch device 88. The winch device is a type which typically includes an operating handle 90 and a ratchet and brake mechanism (not shown) and a drum 92 upon which is wound an elongated cable, or the like 94. Such devices are well known in the art and typically, the winch assembly provides for multiplication of the manual effort applied to arm 90 whereby an operator can lift or otherwise control substantial weights therewith.

Figure 4:
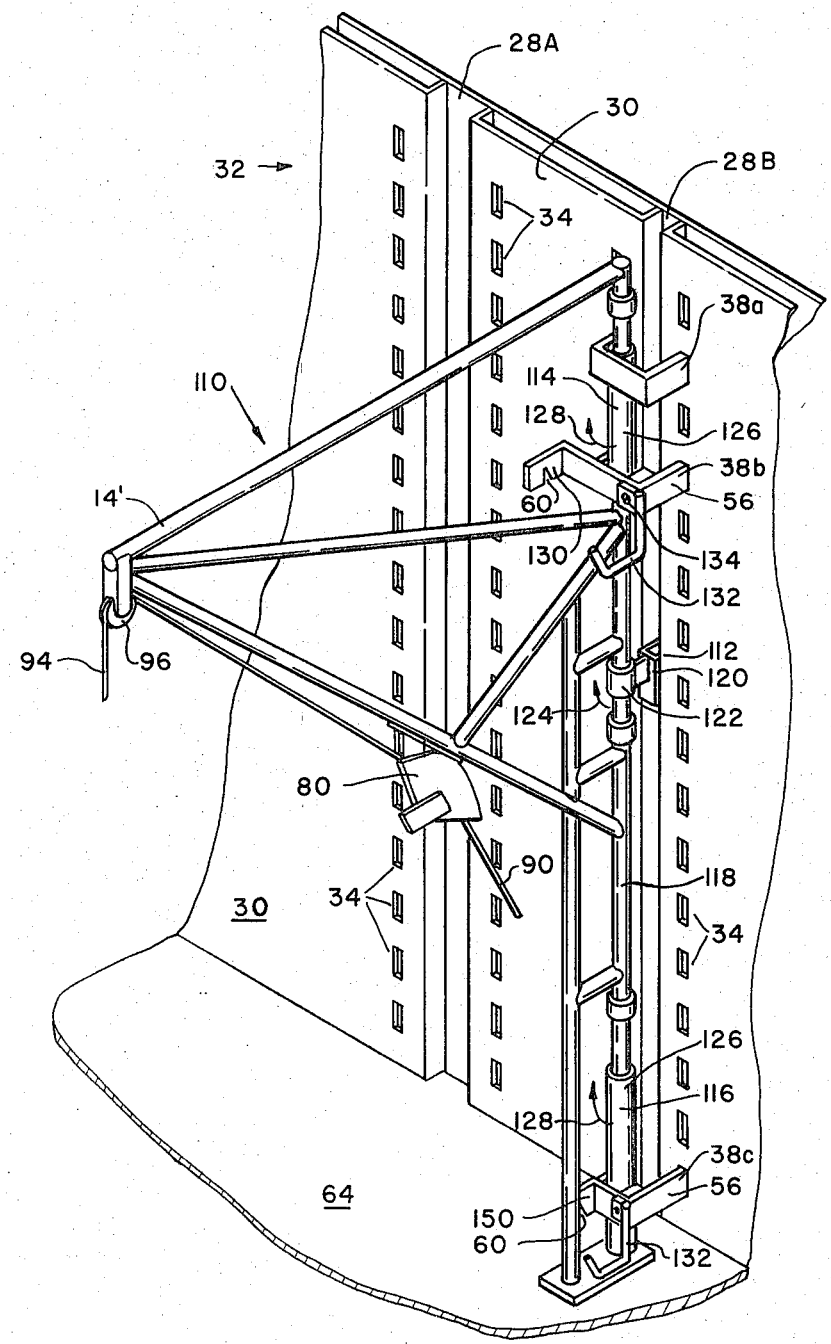
FIG. 4 is a perspective view similar to FIG. 1 showing a slightly modified version of the loading and unloading device of the invention which both can be mounted in the cargo compartment as shown or adjacent an opening of the cargo compartment, for example, the rear opening of a moving van.

Referring now to FIGS. 4 through 6, there is illustrated a slightly modified version 110 of the loading and unloading device 10 above-described. Device 110 includes a boom assembly 14', mast assembly 112, and latch assemblies 114 and 116.

Mast assembly 112 and both latch assemblies 114, 116 are pivotally connected to boom member 118. As shown in the drawings, boom member 118 has a cylindrical exterior surface and a circular cross-section. But for this difference between boom member 118 and post 70 of boom assembly 14, boom assembly 14 and boom assembly 14' could be substantially identical. However, boom assembly 14' is preferred inasmuch as it takes up less space than boom assembly 14.

Mast assembly 112 comprises a mast element 120 which has a longitudinal axis 24 and a rectangular cross-section as does mast 12. Mast element 120 is secured to a cylindrical tube portion 122 which is telescoped over boom member 118. As indicated by arrow 124, mast element 120 assembled on boom member 118 may pivot around the axis of member 118. Like mast 12, mast element 120 is adapted to be received within a selected one of a plurality of elongated, rectangular, vertically positioned recesses 28a or 28b in the upstanding sidewall 30 of a vehicle cargo compartment 32.

Latch means 38a, 38b and 38c are secured to tubular members 126 of latch assemblies 114 and 116, as shown. Latch assemblies 114 and 116 as indicated by the arrows 128 are also capable of pivoting with respect to the boom assembly 14' about the axis of boom member 118. Latch means 38b and 38c have additional hook elements 130 and 132 secured thereto. Hook elements 130 are substantially identical to hook elements 56 and 58. Hook elements 132 are pivotally connected by means of a fastener 134 to the latch means 38b and 38c and are shaped, as shown, to wrap around the edge of an opening in a cargo compartment (see FIGS. 5 and 6). Fastener 134 can be a conventional screw or like fastener.

Except as above-described, device 110 can be substantially similar to the device 10. The device 110 can be mounted on a sidewall of a vehicle cargo compartment by inserting mast element 120 of mast assembly 112 into a recess 28a or 28b and inserting hook elements 56, 58 of latch means 38a, 38b and 38c into the adjacent perforations 34, as shown in FIG. 4. Notches 60 of the hook elements 56 and 58 move downwardly into a position engaging a portion of the sidewall thereby securing the boom 14' to the sidewall while still permitting the same to rotate about the axis of boom member 118. Unlike device 10, device 110 has no foot which engages the floor 64 when mounted in this or the following manner.

As shown in FIGS. 5 and 6, the device 110 can also be secured to sidewall 30 of a vehicle cargo compartment adjacent an opening, for example, the rear opening of the cargo compartment of a moving van by means of the hook elements 130 and 132. To mount the device 110 in this manner, the mast assembly 112 and the latch assemblies 114 and 116 are rotated about the axis of boom element 118, 180° from the position shown in FIG. 4. Hook elements 130 are positioned in perforations 34 adjacent to the rear opening of the cargo compartment and hook elements 132 are pivoted from their at-rest position shown in FIG. 5 into position so as to extend around the end of the sidewall 30 to overlay both the interior and the exterior surfaces of sidewall 30 with portions of the hook element 132. The device 110 mounted in this manner also allows the boom 14' to rotate about the axis of the boom member 118 as before.

Cable 94 is trained over a pulley 96 which is rotatably secured to the distal end of arm 72 by means of suitable welded brackets 98 and a hinge pin 100. The distal end of cable 94 is fitted with an appliance harness 102 which includes a rigid, horizontally extending beam 104 and a plurality of securing straps 106, 108, appliance harness 102 providing a means for securing large articles to the element 94. While an appliance harness is illustrated, it will be apparent to those skilled in the art that other forms of harnesses and load securing means may be used.

The device of the invention is thus seen to provide an inexpensive yet rugged device for aiding in the loading and unloading of cargo into and out of a cargo compartment. Because the loading and unloading device is detachably secured to the wall of the cargo compartment, it can be readily removed therefrom and used with any cargo compartment having recesses such as recesses 28a, 28b, thereby obviating the need of providing each vehicle with such a device. The device is light in weight and requires little space in the cargo compartment, and again because the device is detachable and portable, it can be removed and stored in any convenient place. Further, the device is adapted to utilize conventional structure typically found in the cargo compartments of most vehicles such as moving vans and railroad boxcars or the like and can be installed thereon without any modification thereto.

While there have been described above the principles of this invention in connection with specific apparatus, it is to be clearly understood that this description is made only by way of example and not as a limitation to the scope of the invention.

What is claimed is:

1. A loading and unloading device comprising a boom, means pivotally connected to said boom for securing the same to the sidewall of a cargo compartment, said means including a first portion to be received in a complementary shaped recess adjacent to a row of vertically spaced perforations in said sidewall and a second portion including a plurality of first hook elements for latching to said sidewall remote from an access opening thereto and holding said first portion in said recess, and a second hook element extending in a direction opposite said first hook element for latching to said sidewall adjacent an access opening and holding said first portion in said recess, said first and second hook elements each including a portion adapted to be laterally, slidably received in predetermined ones of said perforations and to vertically, slidably engage a portion of said sidewall, said boom being pivotally swingable in relation to said securing means about an axis which is generally vertical when said boom is latched to said sidewall, said securing means maintaining said axis in said generally vertical position.

2. The device of claim 1 wherein said first portion and said recess are elongated and have rectangular cross sections in a direction generally perpendicular to the longitudinal dimensions thereof, said first portion and recess cross sections being complements of each other.

3. The device of claim 1 wherein there is a plurality of said perforations adjacent each side of said recess, said hook elements each including one of said hook element portions.

4. The device of claim 1 wherein said first and second hook element portion comprises a rectangular bar of rigid material having a cross section complementary to the shape of said perforations, said bar extending generally perpendicular to said wall when said boom is mounted on said wall and including a downwardly facing notch therein adjacent the distal end thereof.

5. The device of claim 1 further comprising a hoist mechanism fixedly secured to said boom.

6. The device of claim 5 wherein said hoist includes a manually operable winch.

7. The device of claim 1 wherein said boom is a multimember truss.

8. The device of claim 7 wherein said truss is generally triangular in shape having a base side and an altitude side, the altitude side of said truss being said mast, the base side of said truss extending generally perpendicular to said mast and adjacent the upper end thereof.

9. The device of claim 1 wherein said second portion further includes a third hook element extending generally perpendicularly to said first and second hook elements to overlay the inside and outside and end surfaces of said sidewall and cooperate with said second hook element to latch said boom to said sidewall adjacent said access opening.

10. The device of claim 9 wherein said second portion includes a plurality of spaced apart latch means, hinge means for securing said boom to each of said latch means for swinging movement about said axis, said latch means each including a plurality of first hook elements, a second hook element extending in a direction opposite said first hook elements, and a third hook element pivotally connected to said latch means, said third hook element being movable from a retracted position into an extended position in which said third hook element cooperates with said second hook element.

11. For use with a vehicle cargo compartment which includes a floor and a sidewall, the sidewall having at least one elongated vertically extending channel therein and a column of perforations therethrough adjacent each side of the channel, a loading and unloading device comprising a mast element having a lateral cross section complementary to the lateral cross section of the channel and adapted to be received therein, a boom, a plurality of spaced apart latch means, hinge means for securing said boom to said mast element and said latch means for swinging movement about an axis, when said mast element is received in said channel each of said latch means being in registry with predetermined ones of the perforations, said latch means each including a plurality of first hook elements for latching said boom to said sidewall remote from an access opening thereto, and a second hook element extending in a direction opposite said first hook element for latching said boom to said sidewall adjacent an access opening.

12. For use in a vehicle cargo compartment wherein the channels in the sidewalls thereof are rectangular in cross section, the device of claim 11 wherein the cross section of said mast element is rectangular, three sides of said mast element engaging three sides of said channel, said hook portions having a cross section complementary to the shape of said perforations.

13. The device of claim 12 wherein there are three of said latch means, two of said latch means being adjacent the upper end of said boom, the third said latch means being secured to said boom adjacent the lower end thereof.

14. The device of claim 11 wherein said boom comprises a plurality of members welded together to form a right-triangular truss, said axis being the axis of one of the orthogonally disposed sides of said truss, the other of the orthogonally disposed sides of said truss extending generally perpendicular to said axis adjacent the upper end of said one orthogonally disposed side.

15. The device of claim 11 wherein said boom further includes a pulley rotatably secured to the apex of said truss remote from said mast, a cable trained over said pulley and a manually operable winch fixedly secured to said truss and operatively coupled to said cable, and means secured on the opposite end of said cable for securing a load thereto.

16. The device of claim 11 wherein said latch means includes a third hook element extending generally perpendicularly to said first and second hook elements to overlay the inside and outside and end surfaces of said sidewall and to cooperate with said second hook element to latch said boom to said sidewall adjacent said access opening.

17. The device of claim 16 wherein said third hook element is pivotally connected to said second portion, said third hook element being movable between a retracted position and an extended position in which it cooperates with said second hook element.

* * * * *